United States Patent [19]
Kobayashi

[11] Patent Number: 5,586,999
[45] Date of Patent: Dec. 24, 1996

[54] METHOD FOR PRODUCING GLASS WITH LOWER ALKALI CONTENT

[75] Inventor: Hisashi Kobayashi, Putnam Valley, N.Y.

[73] Assignee: Praxair Technology, Inc., Danbury, Conn.

[21] Appl. No.: 242,827

[22] Filed: May 16, 1994

Related U.S. Application Data

[63] Continuation-in-part of Ser. No. 894,588, Jun. 5, 1992, abandoned.

[51] Int. Cl.[6] .............................. C03B 5/18; C03B 5/225
[52] U.S. Cl. ..................... 65/134.3; 65/134.4; 65/134.5; 65/135.4
[58] Field of Search ...................... 65/347, 30.12, 65/157, 134.3, 134.4, 134.5, 135.4

[56] References Cited

U.S. PATENT DOCUMENTS

| | | | |
|---|---|---|---|
| 3,337,324 | 8/1967 | Cable, Jr. et al. | 65/135 |
| 3,617,231 | 11/1971 | Fenstermacher et al. | 65/134 |
| 3,960,532 | 6/1976 | Lazet | 65/22 |
| 4,061,487 | 12/1977 | Kiyonaga | 65/135 |
| 4,185,984 | 1/1980 | Kiyonaga | 65/135 |
| 4,473,388 | 9/1984 | Lauwers | 65/134 |
| 4,545,800 | 10/1985 | Won et al. | 65/134 |
| 4,617,042 | 10/1986 | Stickler | 65/27 |
| 4,973,346 | 11/1990 | Kobayashi | 65/135 |

FOREIGN PATENT DOCUMENTS

| | | | |
|---|---|---|---|
| 1182546 | 2/1970 | United Kingdom | 65/157 |

*Primary Examiner*—John M. Hoffmann
*Attorney, Agent, or Firm*—Stanley Ktorides

[57] ABSTRACT

A method for producing lower alkali glass wherein fluxing activity provided by alkali oxides is partly replaced by fluxing activity provided by water in the glassmaking process. Water is effectively and efficiently provided to the glass by the establishment of a high water vapor concentration in the glassmelting zone atmosphere which is produced by a defined heat-generating oxygen-based combustion reducing nitrogen presence and boosting the water vapor concentration, and maintained in the glass by passing molten glass through successive refining and forehearth zones having atmospheres with high water vapor concentrations.

7 Claims, 1 Drawing Sheet

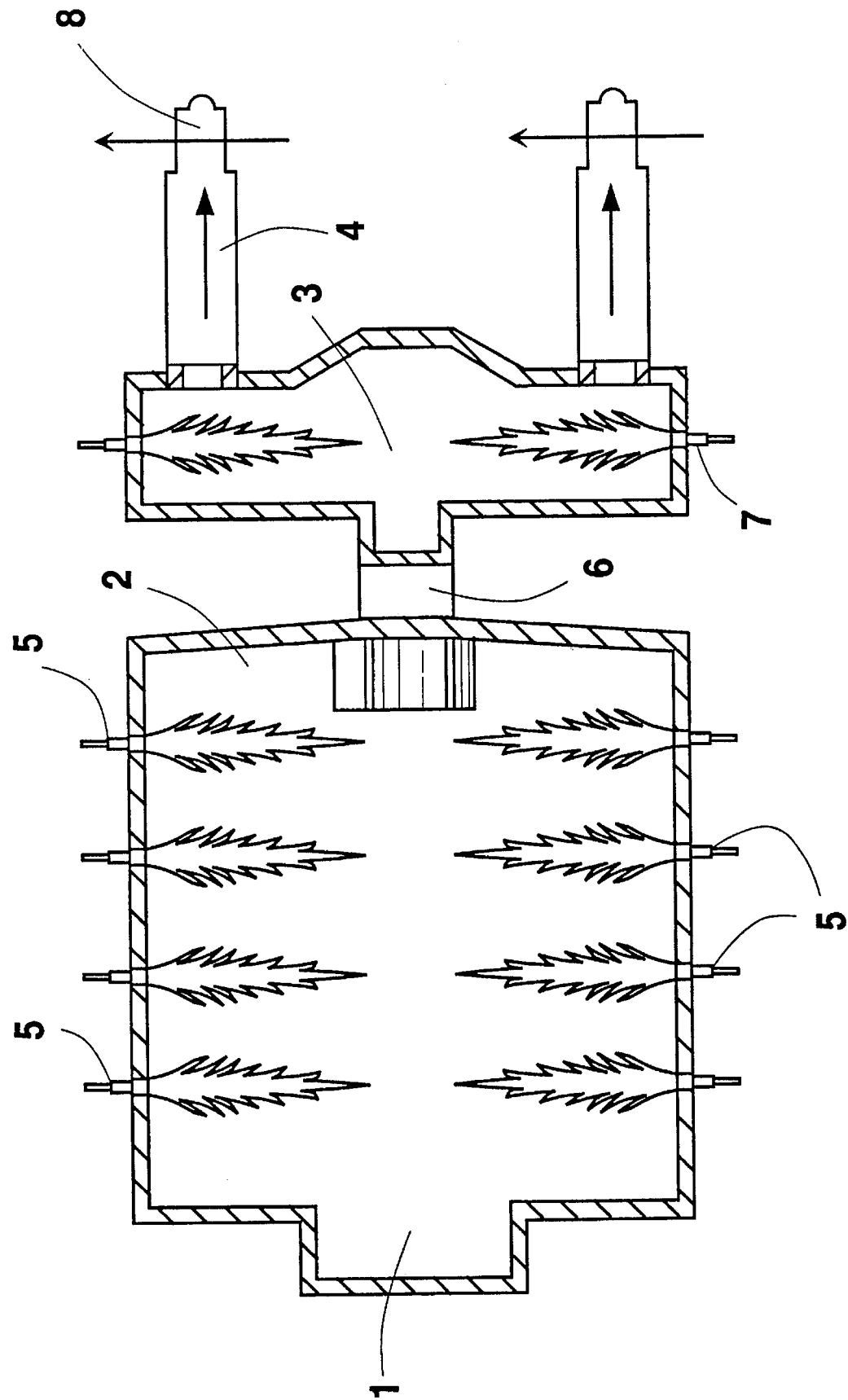

METHOD FOR PRODUCING GLASS WITH LOWER ALKALI CONTENT

This application is a continuation-in-part of prior U.S. application Ser. No. 894,588, abandoned filed Jun. 5, 1992.

TECHNICAL FIELD

This invention relates generally to the field of glassmaking and more particularly to those aspects of the glassmaking process wherein glass forming materials are melted.

BACKGROUND ART

In the making of glass, glass forming materials are provided into a glassmelter and melted into molten glass which is then poured into molds to produce products such as, for example, glass bottles. It is important that the molten glass be well mixed and also that it flow smoothly so that high quality glass results from the glass making process. In order to assure the production of high quality glass, viscosity-reducing flux material is employed as part of the glass forming materials charged into the glass melter. Alkali compounds such as sodium oxide, potassium oxide and lithium oxide are the principal fluxes used in commercial glass production.

Generally, the alkali flux material is the most expensive of the principal glass forming materials. Moreover, a significant amount of alkali flux material must be used in order to adequately achieve the requisite viscosity reduction and other beneficial properties of glass. For example, in a typical soda-lime-silicate glass, about 13 to 16 weight percent of the glass is alkali oxides, e.g. sodium oxide. Thus, it is desirable to reduce the amount of alkali oxide flux material used in glass manufacturing.

It is known that water acts as an effective fluxing agent in glassmaking operations by forming hydroxyl groups in the glass molecular structure. In an effort to supply increased quantities of hydroxyl groups to molten glass in a glassmelting operation, a number of methods have been tried. For example, steam or moist air has been bubbled through molten glass in an electrically heated glassmelting furnace, heating with hydrogen based combustion has been carried out, either above the glass surface or by submerged combustion, and alkali hydroxyl compounds such as sodium hydroxide, potassium hydroxide and lithium hydroxide have been added to the glass batch during melting. None of these methods is used to reduce alkali flux in large commercial furnaces due to the higher costs of these methods.

Accordingly, it is an object of this invention to provide an economical method for producing glass having a reduced alkali content.

SUMMARY OF THE INVENTION

The above and other objects which will become apparent to those skilled in the art upon a reading of this disclosure are attained by:

A method for producing glass while reducing the amount of alkali required as flux comprising:

(A) providing glass forming materials into a glassmelting zone;

(B) combusting fuel and oxidant, having an oxygen concentration exceeding that of air and at least 35 volume percent, to provide heat to the glassmelting zone and to generate sufficient combustion reaction products including water vapor to establish an atmosphere in the glassmelting zone comprising at least 30 volume percent water vapor, and establishing a reduced presence of nitrogen in the glassmelting zone over that which would be present if air were employed as the oxidant to carry out the combustion;

(C) melting glass forming materials in the glassmelting zone by application of said heat provided to the glassmelting zone to produce molten glass;

(D) dissolving water into the molten glass to act as flux while maintaining the water vapor concentration in the glassmelting zone atmosphere at 30 volume percent or more;

(E) passing molten glass from the glassmelting zone into a refining zone and maintaining an atmosphere in the refining zone having a water vapor concentration of at least 30 volume percent; and (F) passing molten glass from the refining zone into a forehearth zone and maintaining an atmosphere in the forehearth zone having a water vapor concentration of at least 30 volume percent, and producing glass having a water content of at least 0.040 weight percent.

In a preferred embodiment of the invention, fuel and oxidant having an oxygen concentration of at least 35 volume percent are combusted in the refining zone to provide heat and combustion reaction products including water vapor to the refining zone to help maintain the water vapor concentration in the refining zone atmosphere and in the forehearth zone atmosphere at 30 volume percent or more.

As used herein, the terms "glassmelter" and "glassmelting zone" mean a furnace or a zone of a furnace where glass forming materials are melted into molten glass.

As used herein, the terms "refiner" and "refining zone" mean a chamber or a zone of a glass melting furnace where molten glass produced in a glassmelting zone is further homogenized and refined by the removal of small gas bubbles.

As used herein, the terms "forehearth" and "forehearth zone" mean one or more channels extending from a refining zone where glass temperature is reduced and controlled to a desired temperature to provide a constant flow of molten glass to one or more forming machines.

BRIEF DESCRIPTION OF THE DRAWING

The sole FIGURE is a plan view representation of one glassmaking furnace system wherein the method of this invention may be practiced.

DETAILED DESCRIPTION

The invention embodies the recognition that previous attempts to reduce the alkali content of glass economically by increasing the water content of glass by changing the atmosphere during the glassmelting step have failed due to the high costs of achieving a high water partial pressure in the atmosphere, coupled with the recognition that the partial pressure of water in the glassmelting atmosphere may be increased by combustion with defined oxidant having a high oxygen concentration. In particular, previous attempts to add water vapor to the atmosphere using steam having foundered because steam is a heat sink which requires a large amount of energy input.

The defined combustion of the invention simultaneously accomplishes three beneficial effects. First, the combustion provides heat to the glassmelter to melt the glass forming materials. Second, the combustion provides water vapor to the glassmelting atmosphere as a consequence of the combustion. Third, the defined combustion with an oxidant having a high oxygen concentration reduces the amount of nitrogen passed into the glassmelter and thus reduces the concentration of nitrogen in the glassmelting atmosphere over that which would be present if air were employed as the oxidant to carry out the combustion. As is known, air is an oxidant having an oxygen concentration of about 21 volume percent with the remainder being mostly nitrogen. This reduces the amount of fuel consumed since nitrogen ballast is now no longer heated. This enables water provided to the glassmelter to accumulate in the glassmelting atmosphere, thus increasing the water partial pressure in the atmosphere and ultimately increasing the water concentration in the molten glass, thereby reducing the amount of alkali flux needed for the glassmaking and consequently the alkali content of the product glass.

The method of this invention may be practiced with any effective glassmelting furnace arrangement. However, it is preferred that the invention be carried out in a glassmelting furnace which is designed to increase or enhance the surface area of molten glass batch materials in contact with the atmosphere in the glassmelting vessel, as this enables an acceleration of the dissolution of water into the molten glass. One such glassmelting furnace is a rotary type glassmelting furnace. Another such furnace is an entrained flow type glass melter where glass forming materials are melted in suspension by an oxy-fuel flame. A conventional crossfired furnace is illustrated in the FIGURE. The method of this invention will be described in detail with reference to the crossfired glassmelting furnace illustrated in the FIGURE.

Referring now to the FIGURE, the glassmaking furnace system comprises glassmelter 2 which communicates by means of throat passage 6 with refiner 3 which in turn communicates with forehearth 4. Glassmelter 2 also includes one or more burners which are fired to provide heat into the glassmelter to melt glass forming materials. In the embodiment illustrated in the FIGURE there are illustrated eight such burners positioned four on each side of glassmelter 2 and oriented to fire in an opposed manner toward each other. The embodiment illustrated in the FIGURE also includes two burners 7 positioned one on each side of refiner 3 for providing heat into refiner 3 to refine the molten glass forming materials passing into refiner 3 from glassmelter 2.

Glass forming materials are fed into glassmelter 2 through feeder 1. The glass forming materials typically include one or more materials such as sand, soda ash, limestone, dolomite, rouge and cullet or scrap glass. The glass forming materials provided into glassmelting vessel 2 will also generally include alkali carbonates which react to form oxides during melting. In the practice of this invention, the alkali oxides provided to the glassmelter will be reduced by from 0.2 to 2.0 weight percent for every 0.01 percent increase in the water content of the glass produced. Examples of alkali oxides include sodium oxide, potassium oxide and lithium oxide.

The burners 5 and 7 are provided with suitable fuel lines and oxidant lines along with cooling fluid inlet and outlet ports which are not shown. One preferred burner is described and claimed in U.S. Pat. No. 4,907,961- Anderson. Examples of suitable fuels which may be used in the practice of the method of this invention include methane, natural gas, oil and hydrogen.

The oxidant which is employed in the practice of the method of this invention has an oxygen concentration which exceeds that of air. It comprises at least 35 volume percent oxygen and preferably comprises at least 50 volume percent oxygen. Most, preferably the oxygen concentration of the oxidant is at least 90 volume percent such as where the oxidant is technically pure oxygen comprising at least 99.5 volume percent oxygen.

The fuel and oxidant are combusted to generate heat and to provide combustion reaction products to glassmelting zone 2. The heat serves to melt the glass forming materials to establish a pool of molten glass within the glassmelting zone. The combustion reaction products include carbon dioxide and water vapor. Due to the reduced presence of nitrogen over that which would be present in the glassmelting zone atmosphere above the molten glass pool if air were employed as the oxidant, the concentration of water vapor in the glassmelting zone atmosphere is significantly increased over that attainable with conventional methods. Sufficient combustion reaction products are provided into the glassmelting zone atmosphere to establish a glassmelting zone atmosphere having a water vapor concentration of at least 30 volume percent and preferably at least 40 volume percent. Not all of the water vapor in the glassmelting zone atmosphere need come from the combustion reaction. For example, water vapor such as in the form of steam may be provided into the glassmelting zone atmosphere to assist in the attainment of the desired water vapor concentration in the glassmelting zone atmosphere.

Water is dissolved into the molten glass as OH groups in the glassmelting zone while the water vapor concentration in the glassmelting zone atmosphere is maintained at 30 volume percent or more. The water acts as a fluxing agent thus reducing the need for alkali oxide fluxes. Generally, the water content of the glass produced by the method of this invention will be at least 0.040 weight percent and preferably will be at least 0.050 weight percent, particularly for soda-lime-silicate glass. Generally, the water content of the glass produced by the method of this invention will not exceed 0.200 weight percent.

The water may be passed into the molten glass for dissolving therein in a number of ways. The high water content atmosphere within the glassmelting zone will cause water to pass from the atmosphere into the molten glass. The speed of the dissolution of water into the molten glass may be increased by increasing the area of the interface between the molten glass and the atmosphere and by increasing the partial pressure of water in the atmosphere. Furthermore, water vapor such as in the form of steam may be bubbled through the molten glass into the glassmelting zone increasing the glass-water contact area and agitating the molten glass thus further increasing the interface area. Another water dissolution enhancing method is the rotation of the glassmelter. Still another water dissolution enhancing method is the melting of glass forming materials in suspension by an oxy-fuel flame. An oxy-fuel flame is a flame produced by the combustion of fuel and an oxidant having an oxygen concentration of at least 35 percent. In this way the glass forming particles are passed through the high temperature oxy-fuel flame suspended by the force of the fluids producing the flame.

After the glassforming materials have passed through glassmelter 2 they are passed in a molten state through throat 6 into refining zone 3 and from there into forehearth 4. In refining zone 3, molten glass is further homogenized and refined by removing remaining small gas bubbles. Refined glass is distributed into forehearth 4 where the glass temperature is reduced to a desired temperature for forming. The molten glass from forehearth 4 can be fed directly into a glass product manufacturing system for the manufacture of glass products such as, for example, fibers, bottles and sheet glass.

In order to ensure the high water content of the final molten glass, the atmosphere in both of the refining zone 3 and forehearth zone 4 has a water vapor concentration of at least 30 volume percent. Such an atmosphere may be most conveniently provided to either the forehearth 4 or the refining zone 3 by combusting fuel with oxidant comprising at least 35 volume percent oxygen, preferably at least 50 percent oxygen and most preferably at least 90 volume percent oxygen, in the same manner as combustion is carried out to provide heat to glassmelting zone 2 as was previously described. The combustion of fuel with the defined oxidant not only provides heat to the forehearth or refining zone, but also provides water vapor and most importantly provides markedly reduced volumes of nitrogen to the subject zone. That is, there is produced in the refining zone and/or forehearth zone an atmosphere having a reduced presence of nitrogen over that which would be present, if air were used as the oxidant to carry out combustion in the refining zone and/or the forehearth zone. It is this reduced provision of nitrogen which enables the relatively small amount of water provided to the atmosphere to have and easily maintain a high partial pressure thus enabling the economical production of low alkali glass. Injection of steam, rather than excess air as is practiced in conventional refiners, is preferred when cooling is required in the refiner.

The product glass manufactured by the method of this invention will contain a reduced concentration of alkali oxides and an increased water content. The increased water concentration need not be very large since water will exhibit a fluxing capability in molten glass which is about 50 to 200 times that of alkali on a unit weight basis so that the weight of alkali oxides in the glass is reduced by 50 to 200 times the weight of the additional water dissolved in the glass in the practice of this invention.

The following examples are presented for illustrative or comparative purposes and are not intended to be limiting.

Glass forming materials comprising sand, lime and soda ash as principal ingredients were processed in a glassmaking system similar to that illustrated in the FIGURE at a glass production rate of 66 tons per day. The glass forming materials were melted by heat provided by the combustion of natural gas with air at a firing rate of 12.4 million BTU per hour. The atmosphere in the glass melter comprised 16 volume percent water, 71 volume percent nitrogen, 10 volume percent carbon dioxide and 3 volume percent oxygen. The atmospheres in the refining zone and in the forehearth zone both contained less than 20 volume percent water. The glass was formed into glass bottles. The glass was analyzed and found to contain 430 ppm water and 14.8 weight percent alkali.

The procedure was repeated except that the heat was provided by the combustion of natural gas with technically pure oxygen at a firing rate of 11.1 million BTU per hour. The atmosphere in the glass melter comprised 39 volume percent water, 34 volume percent nitrogen, 25 volume percent carbon dioxide and 2 volume percent oxygen. However, the atmospheres in both the refining zone and the forehearth zone contained less than 20 volume percent water. After nearly 200 hours of oxygen firing the water content of the glass was 540 ppm, which is surprisingly higher than is achievable with conventional air fired combustion but is significantly less than the 752 ppm which would be the case if equilibrium water conditions could be achieved based on the atmosphere in the melter. The invention comprises the discovery that mere oxygen firing in the melter is insufficient to effectively produce low alkali glass with high water content because either the water will not be completely dissolved in the glass melting zone or the water will escape from the molten glass in the downstream zones.

In order to illustrate the effectiveness of the invention, a glassmaking system similar to that illustrated in the FIGURE is used to produce soda-lime base glass and lead base glass using conventional air firing where the atmosphere in each of the three zones contains less than 20 volume percent water and also with the practice of this invention using pure oxygen firing where the atmosphere in each of the three zones contains more than 30 volume percent water. The calculated results are reported in percentage terms in Table I wherein columns 1 and 3 show the analysis of soda-lime and lead glass respectively made with conventional air firing and column 2 shows the analysis of soda-lime glass and column 4 shows the analysis of lead glass made with the aforedescribed practice of the invention.

TABLE I

|  | 1 | 2 | 3 | 4 |
| --- | --- | --- | --- | --- |
| $H_2O$ | 0.03 | 0.05 | 0.02 | 0.04 |
| $Na_2O$ | 15 | 13 | 7 | 6 |
| $K_2O$ | 2 | 2 | 5 | 4 |
| MgO | 3 | 3 | — | — |
| CaO | 6 | 6 | — | — |
| PbO | — | — | 28 | 28 |
| $Al_2O_3$ | 2 | 2 | 1 | 1 |
| $B_2O_3$ | 1 | 1 | — | — |
| $SiO_2$ | 71 | 73 | 59 | 60 |

After the molten glass has passed through the forehearth, it may be desirable to reduce the high water content of the glass. This is because glass with a lower water content will stiffen quicker in the production of glass products such as bottles. Moreover, glass having both a low alkali content and a lower water content is chemically more durable. One way of reducing the water content of the molten glass produced by the process of this invention is by passing a dry gas, such as dry air, over the surface of the molten glass in a downstream portion of the forehearth or after passing through the forehearth and before passing to a forming machine such as area 8 shown in the FIGURE. By dry it is meant having less than 30 volume percent water, preferably less than 6 volume percent water. In this way, glass products are made with glass having both a low alkali content and a low water content.

In another embodiment of the invention the molten glass may be passed from the glassmelting zone to one or more forming machines while keeping the molten glass free from contact with an atmosphere containing less than 30 volume percent water vapor. A rigorous definition of this embodiment is:

A method for producing glass while reducing the amount of alkali required as flux comprising:
 (A) providing glass forming materials into a glassmelting zone;
 (B) combusting fuel and oxidant, having an oxygen concentration exceeding that of air and at least 35 volume percent, to provide heat to the glassmelting zone and to generate sufficient combustion reaction products including water vapor to establish an atmosphere in the glassmelting zone comprising at least 30 volume percent water vapor, and establishing a reduced presence of nitrogen in the glassmelting zone over that which would be present if air were employed as the oxidant to carry out the combustion;

(C) melting glass forming materials in the glassmelting zone by application of said heat provided to the glassmelting zone to produce molten glass;

(D) dissolving water into the molten glass to act as flux while maintaining the water vapor concentration in the glassmelting zone atmosphere at 30 volume percent or more; and (E) passing molten glass to a forming machine while maintaining the molten glass free from contact with an atmosphere containing less than 30 volume percent water vapor. One way of accomplishing above defined step (E) is passing the molten glass through a refining zone and/or a forehearth zone while maintaining the atmospheres in all of the zones and other areas between the glassmelting zone and the forming machine or machines as having 30 volume percent or more of water vapor. A forming machine is any apparatus which forms molten glass into a desired shape. Examples of such shapes include bottles, sheets and fibers.

Now, by the use of this invention, one can produce glass having a lower alkali content while still having sufficient fluxing capability to effectively produce glass products. Although the invention has been described in detail with reference to certain preferred embodiments, those skilled in the art will recognize that there are other embodiments of the invention within the spirit and scope of the claims.

I claim:

1. A method for producing glass comprising:

(A) providing glass forming materials into a glassmelting zone;

(B) combusting fuel and oxidant, having an oxygen concentration exceeding that of air and at least 35 volume percent, to provide heat to the glassmelting zone and to generate sufficient combustion reaction products including carbon dioxide and water vapor to establish an atmosphere in the glassmelting zone comprising at least 30 volume percent water vapor;

(C) melting glass forming materials in the glassmelting zone by application of said heat provided to the glassmelting zone to produce molten glass;

(D) dissolving water into the molten glass to act as flux while maintaining the water vapor concentration in the glassmelting zone atmosphere at 30 volume percent or more;

(E) passing molten glass from the glassmelting zone into a refining zone and maintaining an atmosphere in the refining zone having a water vapor concentration of at least 30 volume percent;

(F) passing molten glass from the refining zone into a forehearth zone and maintaining an atmosphere in the forehearth zone having a water vapor concentration of at least 30 volume percent; and (G) passing dry gas having less than 6 volume percent water over the molten glass and thereafter passing the molten glass to a forming machine.

2. The method of claim 1 further comprising providing water vapor into the glassmelting zone atmosphere.

3. The method of claim 1 further comprising bubbling water vapor through the molten glass in the glassmelting zone.

4. The method of claim 1 further comprising rotating the glass forming materials in the glassmelting zone.

5. The method of claim 1 wherein the oxidant has an oxygen concentration of at least 90 volume percent.

6. The method of claim 1 wherein the oxidant is technically pure oxygen.

7. The method of claim 1 wherein the glass forming materials are melted in suspension by an oxy-fuel flame.

\* \* \* \* \*